(12) United States Patent
Schuss et al.

(10) Patent No.: US 9,019,153 B1
(45) Date of Patent: Apr. 28, 2015

(54) CALIBRATION OF LARGE PHASED ARRAYS USING FOURIER GAUGE

(75) Inventors: Jack J. Schuss, Newton, MA (US); Thomas V. Sikina, Acton, MA (US); Jeffrey C. Upton, Groton, MA (US)

(73) Assignee: Raytheon Company, Waltham, MA (US)

( * ) Notice: Subject to any disclaimer, the term of this patent is extended or adjusted under 35 U.S.C. 154(b) by 630 days.

(21) Appl. No.: 13/331,334

(22) Filed: Dec. 20, 2011

(51) Int. Cl.
  *G01S 13/00* (2006.01)
  *G01S 7/40* (2006.01)

(52) U.S. Cl.
  CPC .............. *G01S 7/40* (2013.01); *G01S 7/4008* (2013.01); *G01S 7/4021* (2013.01); *G01S 7/4004* (2013.01)

(58) Field of Classification Search
  CPC ............................................ G01S 7/40–7/4056
  USPC .......... 342/165–175; 324/500, 501, 522, 523, 324/527, 530, 537, 750.02, 750.12, 324/754.21–754.31
  See application file for complete search history.

(56) References Cited

U.S. PATENT DOCUMENTS

| | | | | | |
|---|---|---|---|---|---|
| 4,488,155 | A | * | 12/1984 | Wu | 342/376 |
| 4,926,186 | A | * | 5/1990 | Kelly et al. | 342/360 |
| 5,175,802 | A | * | 12/1992 | Crookshanks | 382/278 |
| 5,187,486 | A | * | 2/1993 | Kolzer | 342/360 |
| 5,294,934 | A | * | 3/1994 | Matsumoto | 342/173 |
| 5,313,213 | A | * | 5/1994 | Neumann et al. | 342/165 |
| 5,406,209 | A | * | 4/1995 | Johnson et al. | 324/750.3 |
| 5,469,064 | A | * | 11/1995 | Kerschner et al. | 324/537 |
| 5,530,449 | A | * | 6/1996 | Wachs et al. | 342/174 |
| 5,559,519 | A | * | 9/1996 | Fenner | 342/174 |
| 5,623,270 | A | * | 4/1997 | Kempkes et al. | 342/372 |
| 5,640,101 | A | * | 6/1997 | Kuji et al. | 324/756.03 |
| 5,861,843 | A | * | 1/1999 | Sorace et al. | 342/372 |
| 5,929,809 | A | * | 7/1999 | Erlick et al. | 342/372 |
| 6,026,135 | A | * | 2/2000 | McFee et al. | 376/159 |
| 6,078,289 | A | * | 6/2000 | Manoogian et al. | 342/373 |
| 6,084,545 | A | * | 7/2000 | Lier et al. | 342/360 |
| 6,087,995 | A | * | 7/2000 | Grace et al. | 343/703 |
| 6,127,966 | A | * | 10/2000 | Erhage | 342/174 |
| 6,163,296 | A | * | 12/2000 | Lier et al. | 342/417 |
| 6,329,952 | B1 | * | 12/2001 | Grace | 343/703 |
| 6,335,705 | B1 | * | 1/2002 | Grace et al. | 343/703 |
| 6,384,781 | B1 | * | 5/2002 | Kautz et al. | 342/368 |
| 6,507,315 | B2 | * | 1/2003 | Purdy et al. | 342/374 |
| 6,609,451 | B1 | * | 8/2003 | Inoue et al. | 89/1.13 |
| 6,636,173 | B2 | * | 10/2003 | Graham | 342/174 |
| 6,686,873 | B2 | * | 2/2004 | Patel et al. | 342/174 |
| 6,720,919 | B1 | * | 4/2004 | Sinsky et al. | 342/368 |
| 6,771,216 | B2 | * | 8/2004 | Patel et al. | 342/368 |
| 7,538,564 | B2 | * | 5/2009 | Ehrmann et al. | 324/754.23 |
| 7,675,300 | B2 | * | 3/2010 | Baur et al. | 324/754.22 |

(Continued)

OTHER PUBLICATIONS

Notice of Allowance and Issue Fee Due dated Dec. 7, 2011 for U.S. Appl. No. 12/635,893, 5 pages.

(Continued)

*Primary Examiner* — Peter Bythrow
(74) *Attorney, Agent, or Firm* — Daly, Crowley, Mofford & Durkee, LLP

(57) ABSTRACT

Methods and apparatus for a calibration system including a support structure movable over an array, a super-element secured to the support structure to obtain information at selected locations in relation to the array, and a processor to compute a sum of voltages for determining a level of calibration for the array.

17 Claims, 15 Drawing Sheets

(56) References Cited

U.S. PATENT DOCUMENTS

| | | | |
|---|---|---|---|
| 7,808,427 B1* | 10/2010 | Sarcione et al. | 342/188 |
| 2003/0038747 A1* | 2/2003 | Patel et al. | 342/368 |
| 2003/0057971 A1* | 3/2003 | Nishiyama et al. | 324/751 |
| 2003/0117315 A1* | 6/2003 | Graham | 342/174 |
| 2005/0270223 A1* | 12/2005 | Baharav et al. | 342/52 |
| 2006/0028230 A1* | 2/2006 | Wenzel et al. | 324/770 |
| 2008/0150557 A1* | 6/2008 | Baur et al. | 324/751 |
| 2010/0259438 A1* | 10/2010 | Jones et al. | 342/22 |
| 2011/0187583 A1 | 8/2011 | Nouvel et al. | |
| 2012/0146631 A1* | 6/2012 | Lacey | 324/210 |

OTHER PUBLICATIONS

U.S. Appl. No. 13/662,641, Office Action dated Oct. 14, 2014, 14 pages.

U.S. Appl. No. 13/550,890 Notice of Allowance dated Sep. 2, 2014, 16 pages.

U.S. Appl. No. 13/329,682 Response to Office Action filed Sep. 2, 2014, 8 pages.

* cited by examiner

Array to be calibrated

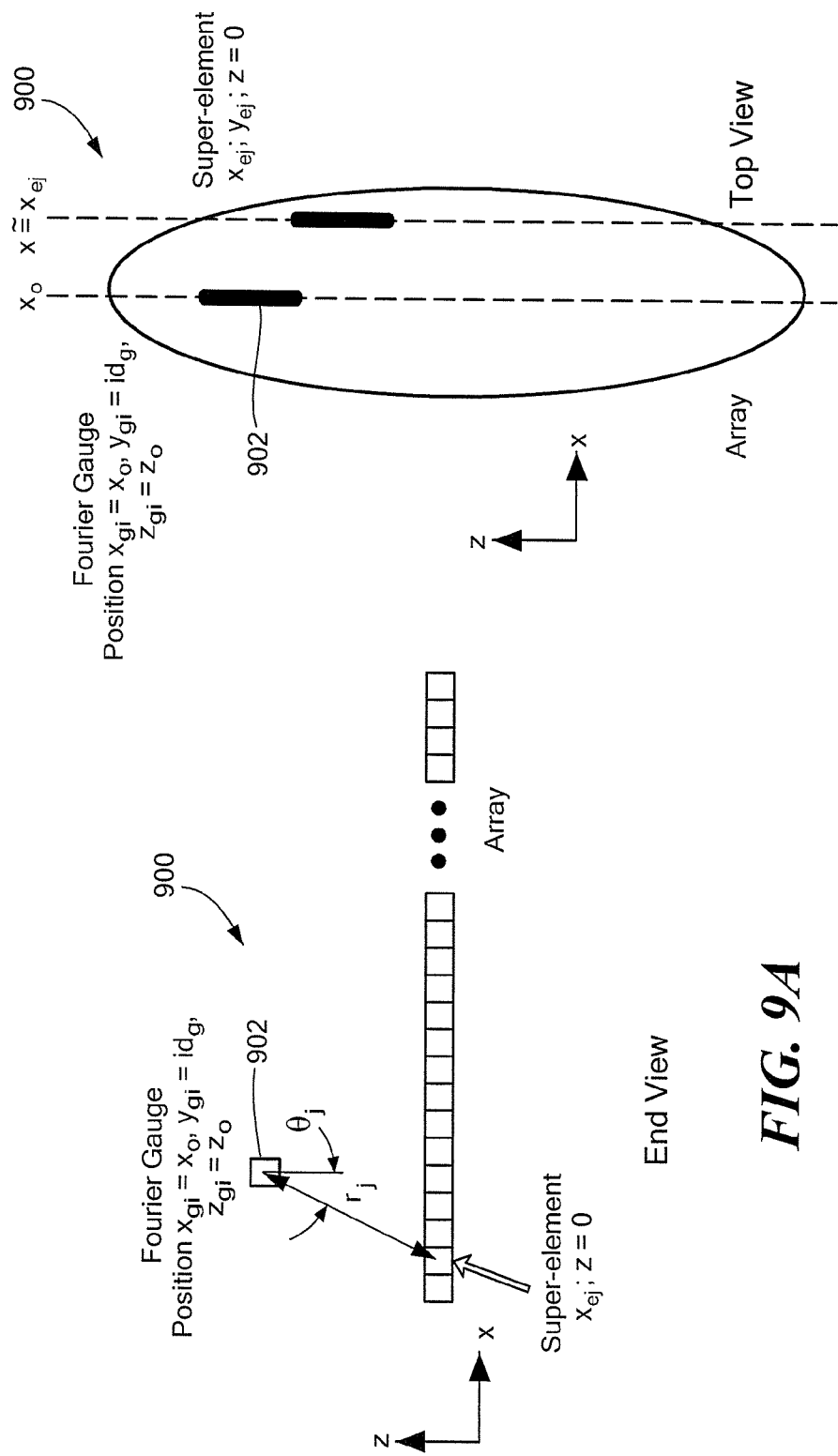

End View

Side View

CALIBRATION OF LARGE PHASED ARRAYS USING FOURIER GAUGE

STATEMENT REGARDING FEDERALLY SPONSORED RESEARCH

This invention was made with government support under Contract No. FA8722-09-C-0004 awarded by the United States Air Force. The government has certain rights in the invention.

BACKGROUND

As is known in the art, phased array antennas in general must be calibrated at several levels in order to operate effectively. Since a phased array typically uses many active and passive components to form its aperture illumination (amplitude and phase) state, these components must be properly aligned in order to form a high efficiency radiation beam. While various methods are available to provide the initial calibration state, to correct for variability (recalibration), and to identify failed components for replacement, calibration often can be verified by or controlled through either near field or far field sensing methods. Very large microwave and RF phased array radars have apertures that can have lengths exceeding over 200 wavelengths, for example, in any aperture dimension, making either near or far field sensing expensive and difficult.

In one known technique, individual components are calibrated in the chain extending from the antenna beam port. After calibration in the factory, these components are assembled in the field to produce an initially calibrated aperture. However, this type of calibration has a number of drawbacks, including, for example, reliance on a book keeping system to catalogue the calibrated components in the beam formation chain. Mistakes in keeping track of the components can produce an un-calibrated system. Furthermore, its cost is high due to the need for a precision calibration of a large number of components and cables. In addition, in this method there is no means of verifying the calibrated state, such that whenever a vector state error is produced, which can be due to assembly error, natural component degradation, or error, the error cannot be directly detected.

Another known calibration method that is complicated by large phased arrays relies on a so-called "gold standard." This calibration approach detects the transmission vector for a series of components usually housed within a common sub-assembly, such as a TREA (Transmit-Receive Element Assembly). Like the individual calibration approach, this method alone provides no direct sensor to determine whether and to what extent component degradation affects the calibration state.

Some methods rely on near or far field sensors to detect the aperture vector state, both initially, and during the life of the antenna system. Large phased array planar systems impose significant problems for such calibration approaches because of the reliance on near or far field sensors. In the antenna near field, sensors require large and accurate equipment to position a probe antenna in a plane near to and parallel with the fielded antenna aperture plane, or a virtual plane near the aperture. The size and accuracy of known equipment for positioning near field sensors are significant cost factors. Beyond this, known near field sensors require considerable system down-time in order to determine the antenna aperture vector state, which is a prerequisite for calibration and recalibration. Far field calibration sensors alone are a complex and expensive approach for large array calibration because of the significant separation distances involved. For example, a microwave antenna with its longest dimension of 200 wavelengths needs far field sensors separated from the antenna aperture by approximately 80,000 wavelengths. For even larger systems, it quickly becomes very difficult to provide an accurate microwave source at such distances, particularly when the positional accuracy and the implications of fielded antenna beam scanning are also considered.

The calibration methods typically used for phased arrays are clearly disadvantageous for large apertures. In addition, a considerable challenge comes in the form of a digitally beam forming system. As a result, additional microwave connectivity is needed to calibrate the digital channels. Without such calibration, these digital networks may drift, and as a result, produce array and system losses that can degrade the system performance and capabilities.

It will be appreciated that various known RF injection techniques have been used in moderately sized phased array antennas. These include beacon methods, such as the use of aperture peripheral horn antennas, or near field antennas, or the use of array radiating element mutual coupling. However, these methods have significant disadvantages when considered for large phased arrays. For example, the beacon methods require a source antenna in the large array near field, thus causing difficulties in providing physical support while remaining outside of the large array field of view, source physical stability, and limitations on the large array aperture field variation, particularly when frequency scanned elements are used. Mutual coupling methods are also limited when these elements are used, largely because inter-element coupling is not typically sufficient predictable for accurate initial calibration.

SUMMARY

In one aspect of the invention, a system comprises a calibration system, comprising: a support structure movable over an array, a calibrator secured to the support structure to obtain information at selected locations in relation to the array, and a calibration module to compute a sum of voltages for different positions of the calibrator with respect to the array for determining a level of calibration for elements in the array.

The system can further include one or more of the following features: a controller to move the calibrator in steps along a length of the array, the calibrator moves in only a first one of x, y, and z axes for a first pass over the array, the calibration module computes a position error of the calibrator, the calibrator has the same structure as an array element, an optical element to optically align a position of the calibrator, a further calibrator to calibrate the array, a track to support the support structure, a length of the array is over 160 meters in length, and/or the calibrator comprises a super-element.

In another aspect of the invention, a method comprises: positioning a calibrator to positions over an array, receiving responses at the calibrator for the positions of the calibrator, and computing a vector sum of the responses at the calibrator to determine a level of calibration of the array.

The method can further include one or more of the following features: determining a position error of the calibrator in relation to the array, adjusting phase and/or amplitude controls of elements in the array based on the responses at the calibrator, the calibrator comprises a super-element and the array comprises super-elements, moving the calibrator in only a first one of an x, y, and z axis, phase-aligning array elements to maximize a vector sum at the calibrator for aligning the array to a selected steering angle, and/or adjusting array element amplitude controls to provide a desired amplitude taper at the calibrator.

In a further aspect of the invention, an article comprises: non-transitory instructions stored on a computer-readable medium that enable a machine to perform: positioning a calibrator to positions over an array, receiving responses at the calibrator for the positions of the calibrator, and computing a vector sum of the responses at the calibrator to determine a level of calibration of the array. The article can further include instructions for processing a position error of the calibrator in relation to the array.

BRIEF DESCRIPTION OF THE DRAWINGS

The foregoing features of this invention, as well as the invention itself, may be more fully understood from the following description of the drawings in which:

FIG. 9A is a schematic end view of a calibrator positioned above an array;

FIG. 9B is a schematic top view of a calibrator positioned above an array;

DETAILED DESCRIPTION

Figure 1:
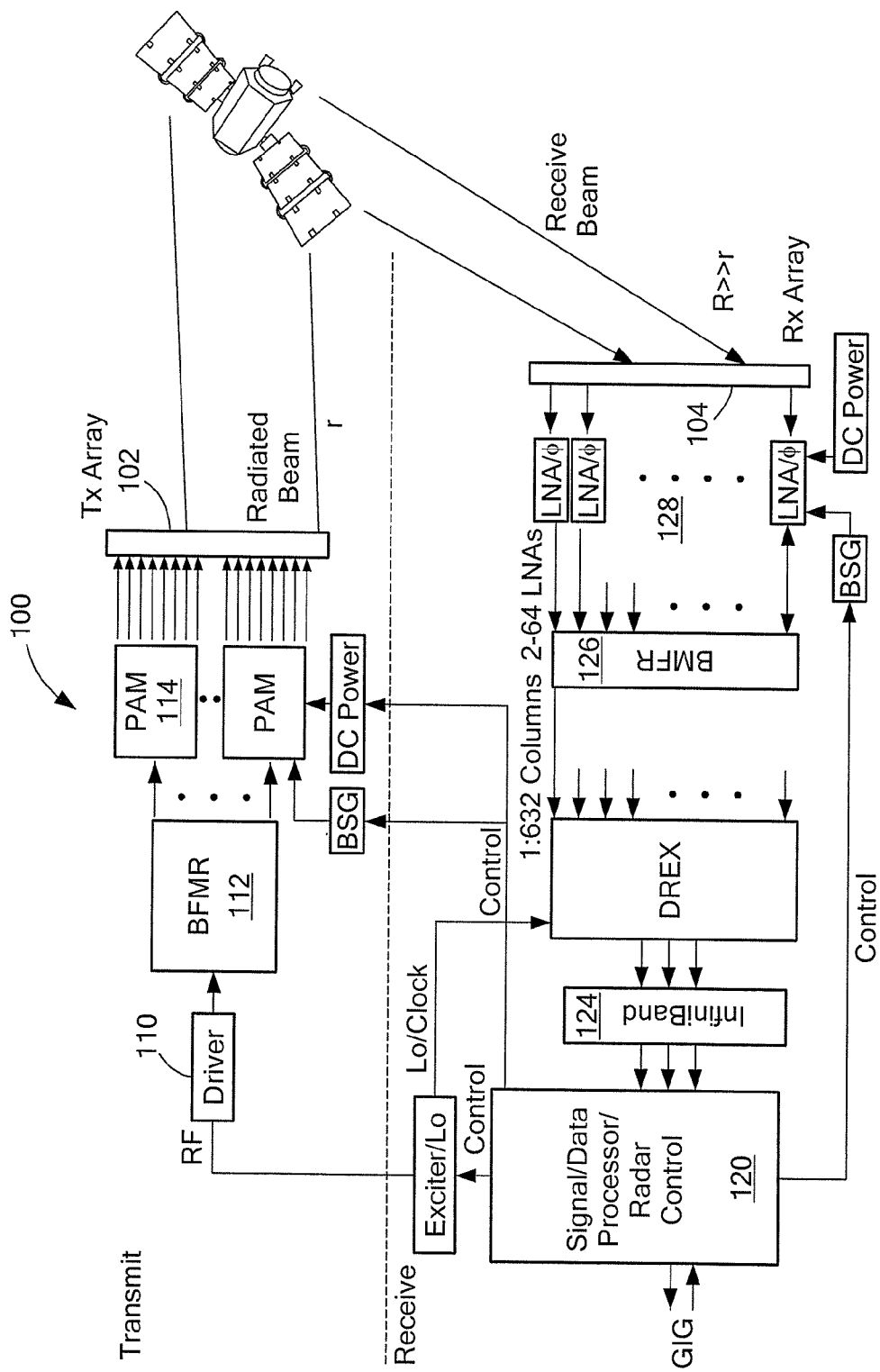
FIG. 1 is a schematic representation of a radar system having array calibration in accordance with exemplary embodiments of the invention

FIG. 1 shows an exemplary radar system 100 having array calibration using a Fourier Gauge in accordance with exemplary embodiments of the invention. The transmit and receive arrays are relatively large having lengths of over 150 meters in length. In one embodiment, the system 100 is well suited for detecting and tracking satellites.

As used herein, the term "Fourier Gauge" refers to "a physical and/or mathematical construct of multiple collinear super-elements that serves to align and calibrate a phased array to a desired illumination function and a desired wavevector component in the direction of the collinear super-element construct.

The system 100 includes on the transmit side a driver 110 coupled to a digital beamformer 112 feeding a PAM (Power Amplifier Module) 114, which energize the transmit array 102. The receive side includes a signal data processor control module 120 coupled to a digital receive system (DREX) 122 via a universal I/O device 124, such as InfiniBand. The receive beamformer 126 receives input from the low noise amplifiers 128, which are coupled to the receive array 104. The output of the receive beamformer 126 is coupled to the DREX 122. As described in detail below, the transmit and receive arrays are calibrated to obtain sufficient performance levels.

Figure 2:
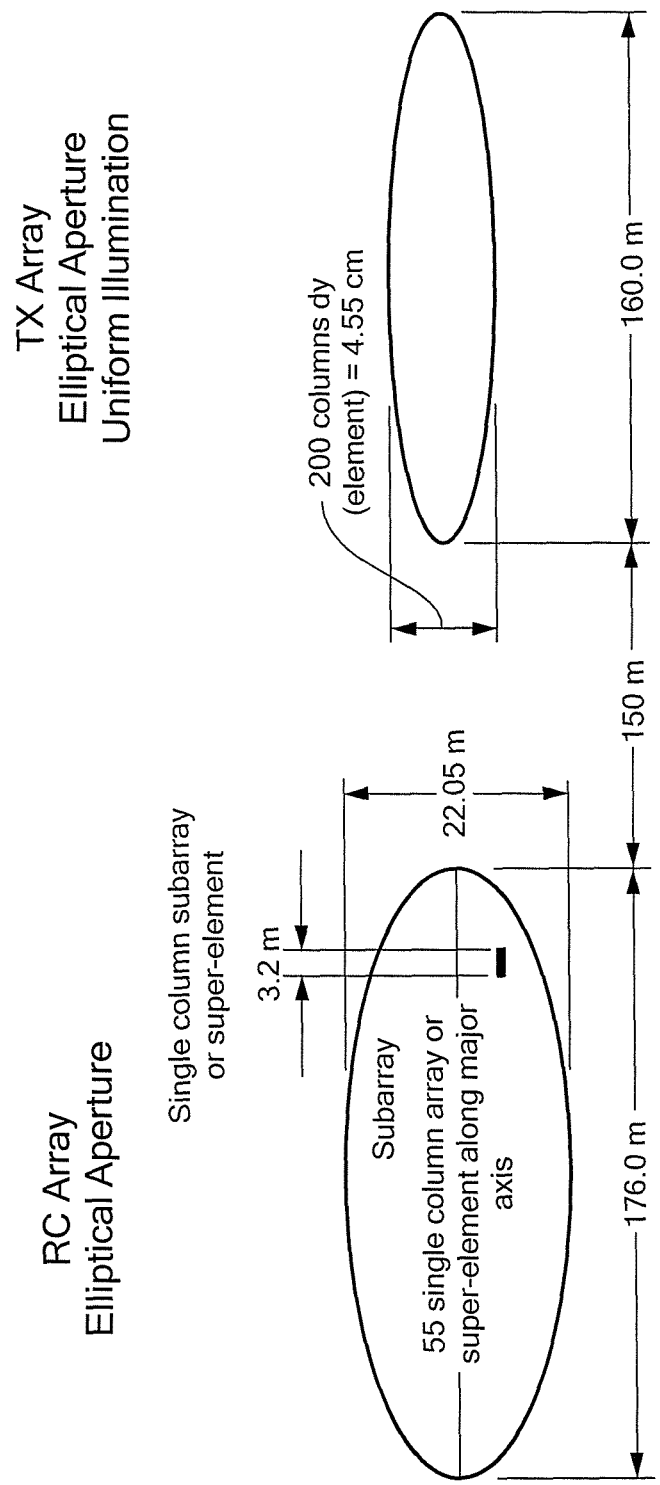
FIG. 2 is a high level diagram showing receive and transmit arrays that can be calibrated in accordance with exemplary embodiments of the invention.

FIG. 2 shows dimensions for an exemplary receive array 200 and a transmit array 210, each having elliptical apertures. The receive array 200 has a length of about 176 meters and a width of about 22 meters. The transmit array 210 had a length of about 160 meters and width of about 9 meters. The arrays 200, 210 comprise columns of super-elements to provide transmit and receive functionality. The challenges in calibrating arrays of this size will be readily apparent to one of ordinary skill in the art.

Figure 3:
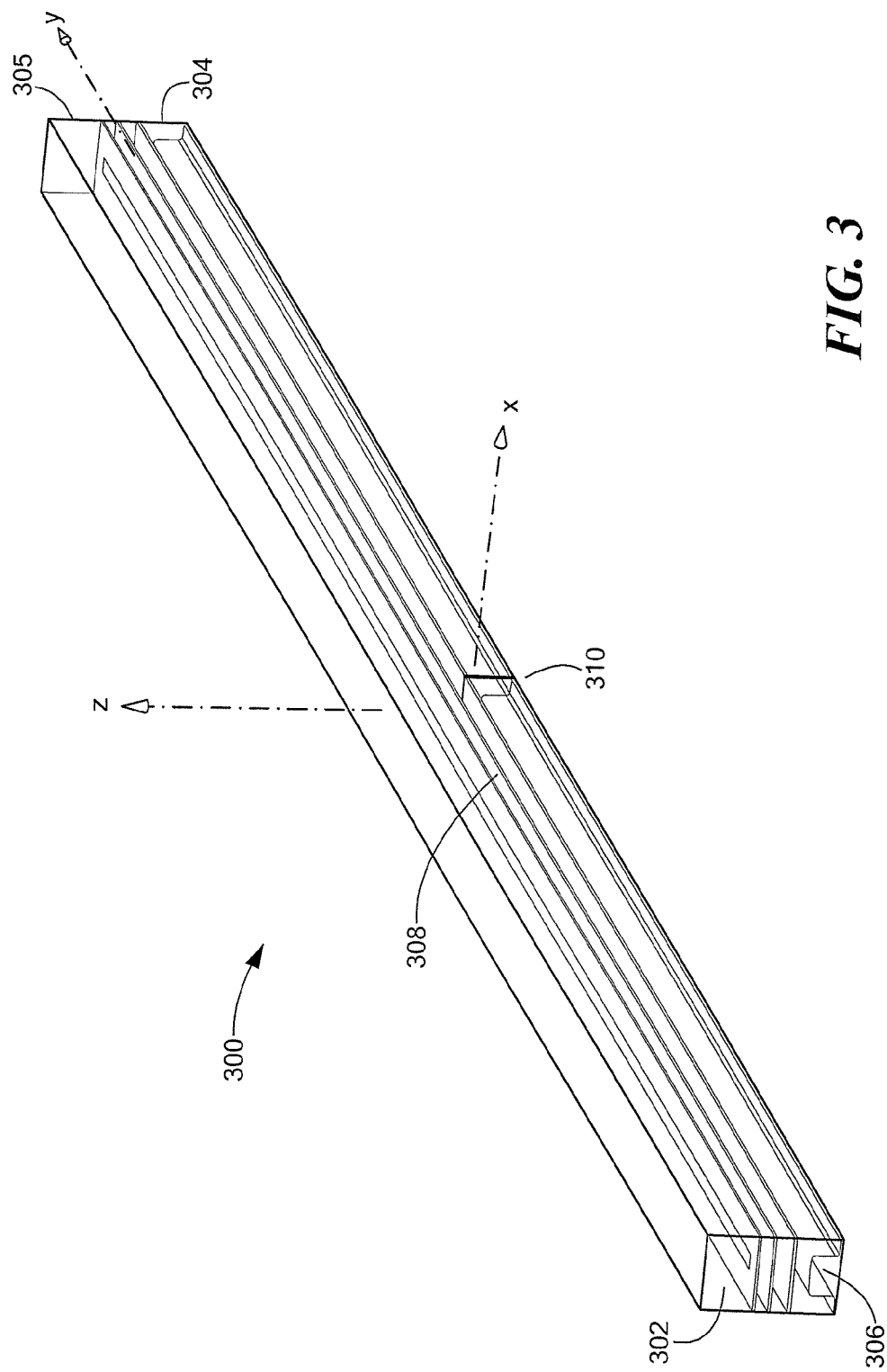
FIG. 3 is a schematic representation of a super-element that can form a part of the calibration system in accordance with exemplary embodiments of the invention.
Figure 4:
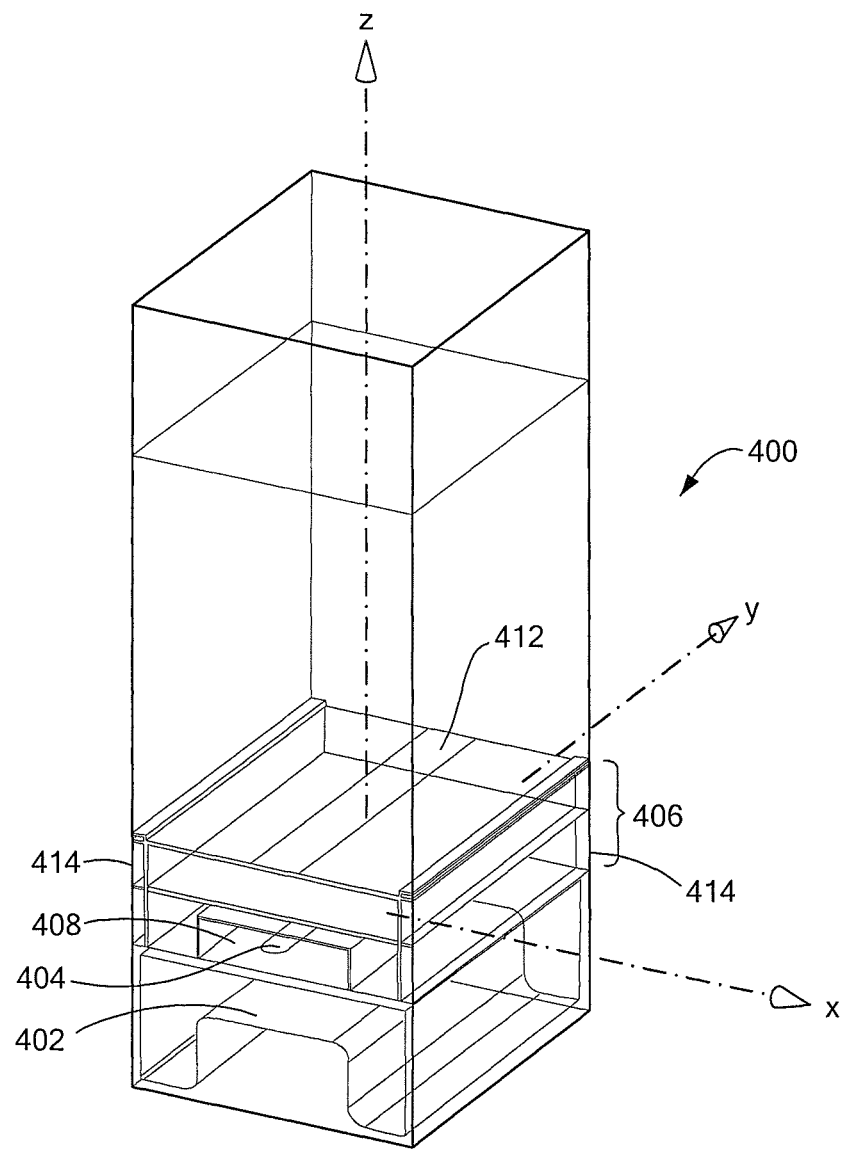
FIG. 4 is a depiction in model form of a unit cell of a super-element.

FIG. 3 shows an exemplary super-element radiator 300 and FIG. 4 shows a unit cell 400 in the super-element. The super-element 300 includes an input port 302 and a termination port 304. Simulated radiation boundaries 305 are disposed in the xz plane above a ridged waveguide 306 that extends along an axis of the super-element. Simulated master/slave walls 308 are located on the sides in yz plane above the waveguide 306. Note that a split 310 in the waveguide is shown for modeling purposes to help the meshing process.

FIG. 4 shows some further detail for a unit cell 400 of the radiator. The unit cell includes a single ridge waveguide 402, which is well known in the art. With a feed port at one end of the super-element and a termination at the other end, the super-element acts as a transmission line distributing electromagnetic power to each of the unit cells. The upper conductive wall of the waveguide is interrupted with a slot coupler 404 (see FIG. 6A). A dielectric assembly 406 is disposed over the waveguide 402. In an exemplary embodiment, the dielectric assembly includes a channel 408 and a layer stack shown in detail in FIG. 5A, which shows exemplary dimensions for the unit cell 400. The dielectric assembly includes first (shown in FIG. 5A) and second conductive strips or patches 410, 412 located at first and second heights above the coupling slot 404. The resonant conductive strips 410, 412 are suspended with low loss foam dielectric materials in a single sub-assembly. In an exemplary embodiment, the strips 410, 412 are continuous over the full length of the super-element. Conductive walls 414 enclose the dielectric and strip subassembly, also running the full length of the super-element. The conductive walls 414 form a long slot radiator, with an opening extending the full length of the super-element. As shown in FIG. 5B, the coupler 404 is approximately 1.52 inches long, 0.15 inches wide, with semi-circular ends, and is cut out of the full height of the upper waveguide wall.

Figure 6A:
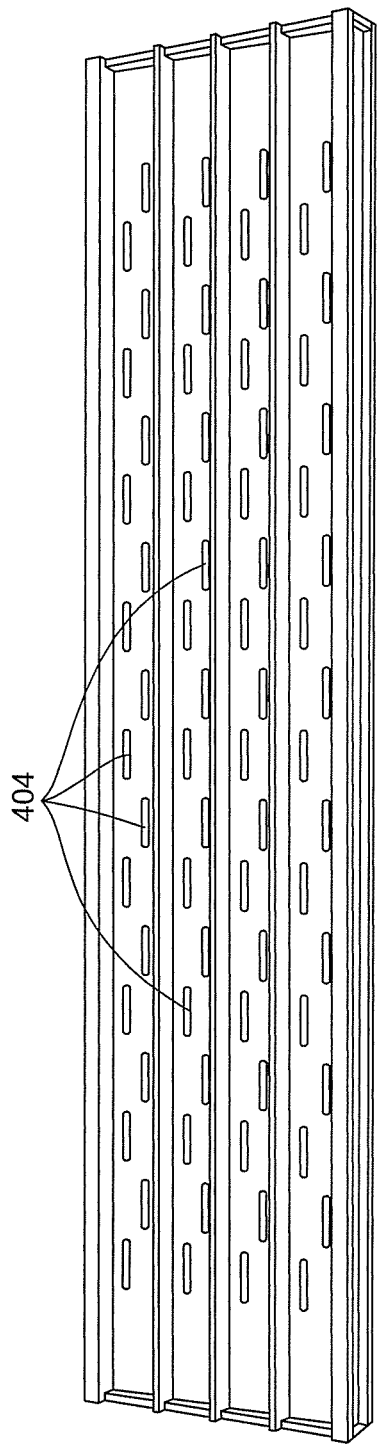
FIGS. 6A-D show a pictorial representation of a super-element assembly with FIG. 6B showing the super-element with a form core assembly.
Figure 6B:
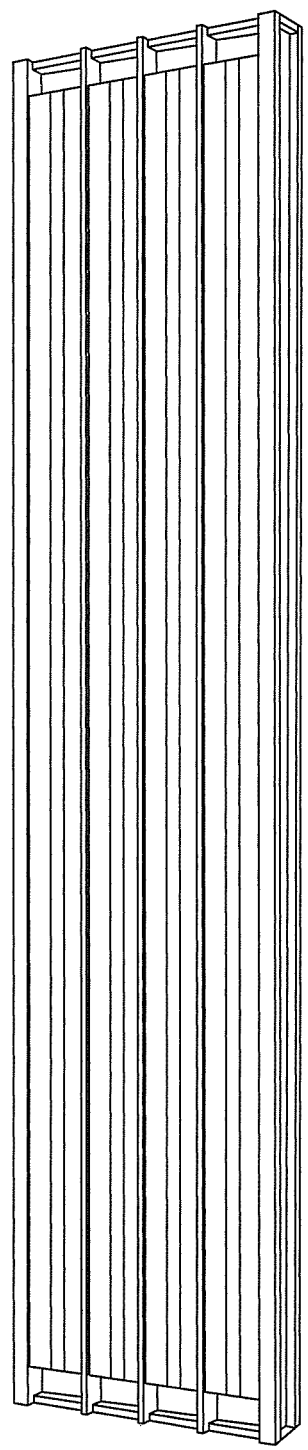
Figure 6C:
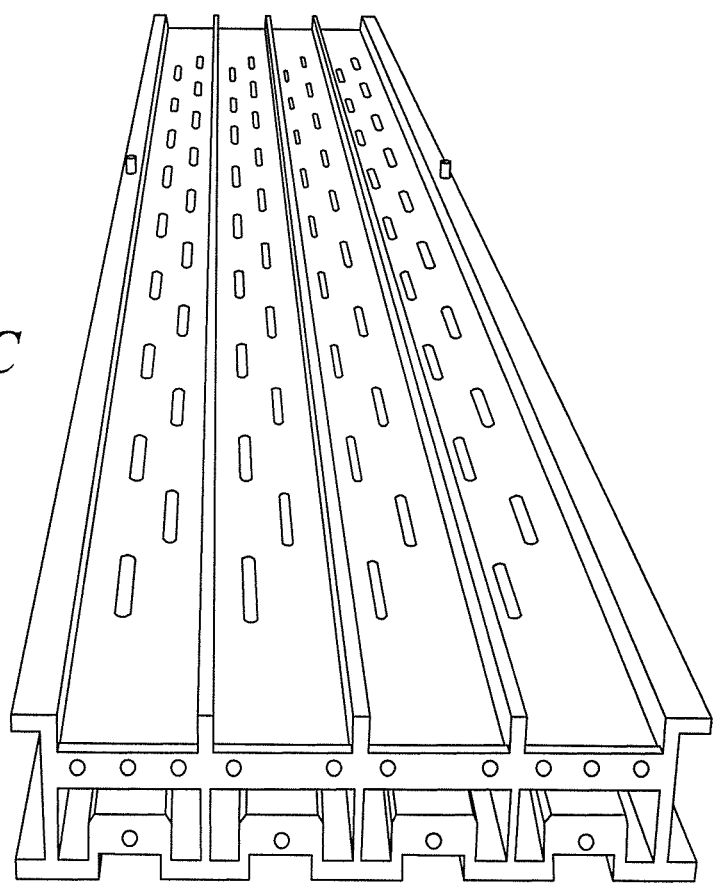
Figure 6D:
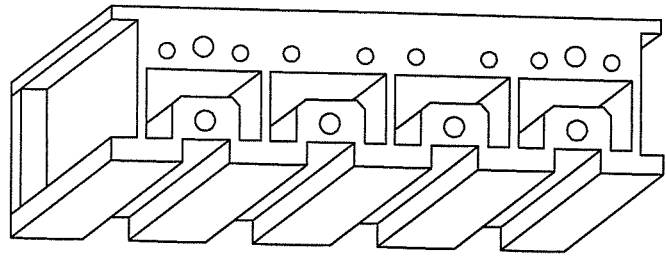

FIGS. 6A-D show pictorial representations of super-element radiators in accordance with exemplary embodiments of the invention. FIGS. 6A, 6C, and 6D show the super-element assembly without the dielectric assembly. FIG. 6B shows the super-element assembly with dielectric/foam core assemblies. FIG. 6D shows an exemplary coax to waveguide transmission. It is understood that any suitable transition to waveguide can be used.

Figure 5A:
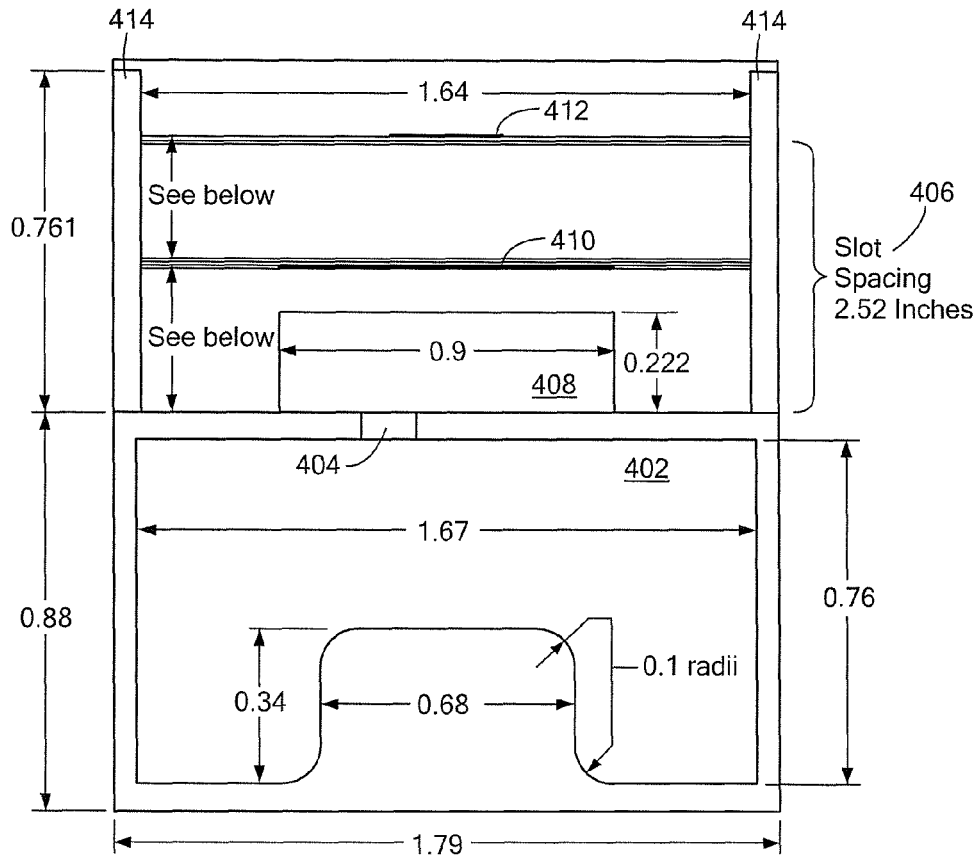
FIG. 5A is a cross-sectional view of a super-element and FIG. 5B is a top view of a portion of a super-element.
Figure 5B:
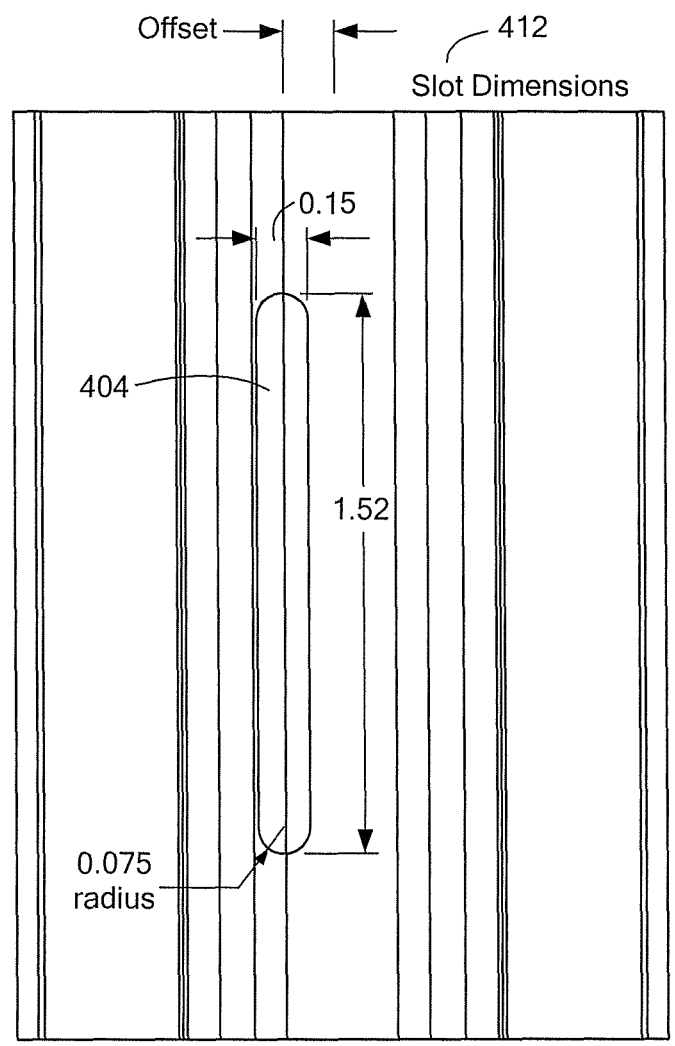
Figure 7:
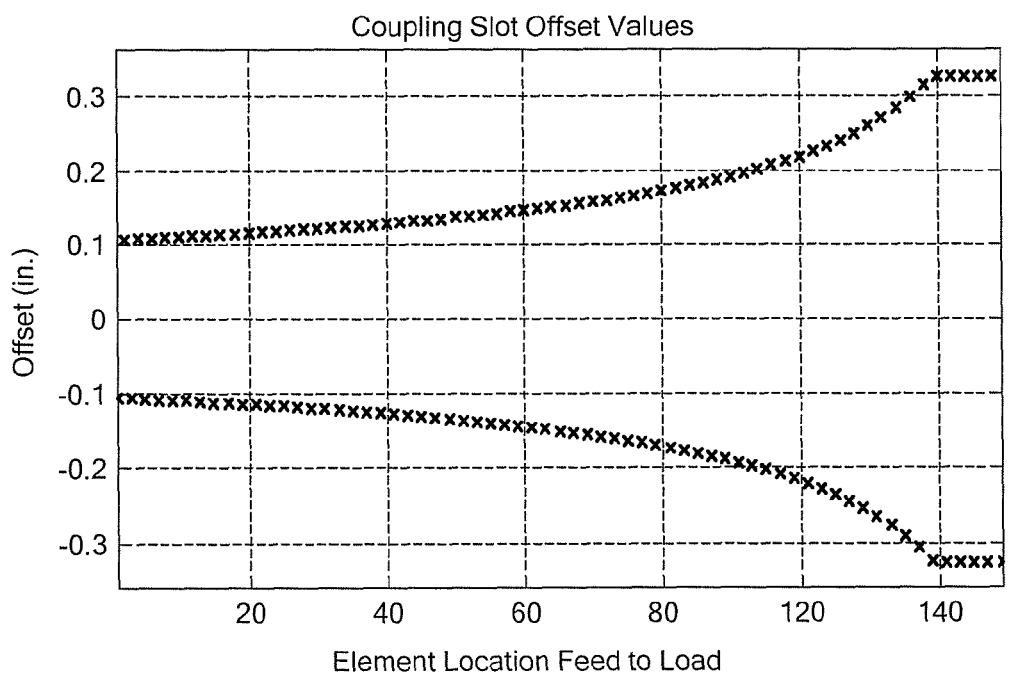
FIG. 7 is a graphical depiction of coupling offset value versus the element location along the super-element.

As shown in FIGS. 5A and 6A, for example, the slots 404 are offset from a longitudinal axis of the super-element assembly, i.e., the y axis of FIG. 3. Slot offset values, such as shown in FIG. 5A and FIG. 6A, vary from the feed to the load end, following a logarithmic curve with staggered or opposing slot positions relative to the waveguide center line for each unit cell, as shown in FIG. 7. The offsets are shown for a 129-element radiator.

Figure 8:
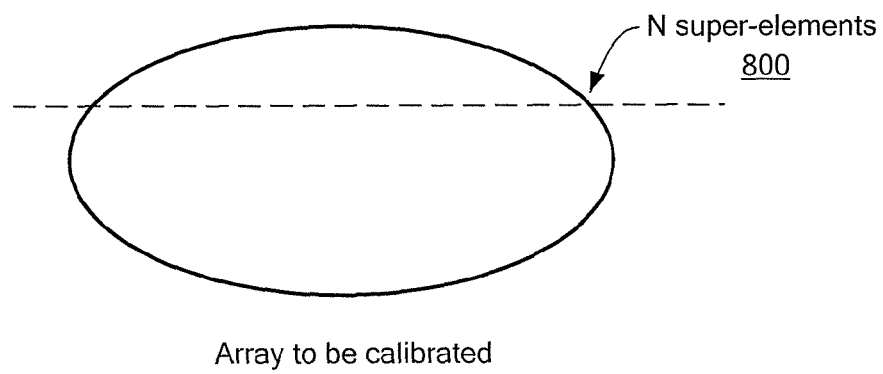
FIG. 8 is a schematic representation of a Fourier Gauge calibration system in accordance with exemplary embodiments of the invention.

FIG. 8 shows a high level block diagram of array calibration in accordance with exemplary embodiments of the invention. A series of N super-elements 800 are aligned end-to-end to form a length Lg. The length of super-elements 800 are located above the array to be calibrated. In one embodiment, the super-elements 800 have the same structure as the super-elements in the arrays. In another embodiment, the super-element has a different taper of slots than those of the array, as shown in FIG. 7, resulting in a uniform amplitude distribution in the Fourier Gauge super-element 800. The positioning of the super-elements 800 can be achieved using optical alignment.

Assuming uniform illumination, the response to an incident plane wave having $k=(2\pi/\lambda)\sin\theta$, where $k_0=(2\pi/\lambda)\sin\theta_0$, $\sin\theta_0(f)$ are defined by the super-element, $$Vout = \frac{\sin(k-k_0)M_d/2}{\sin(k-k_0)d/2} \frac{\sin(k-k_0)ND/2}{\sin(k-k_0)D/2}, \quad \text{Equation (1)}$$

where d is the slot spacing, D is the super-element length≈Md, N~55, and M~50, and k is the wave vector component magnitude in the direction of the Fourier Gauge, and k is the wavelength.

Equation (1) shows that the virtual column of the Fourier Gauge super-elements of length L=ND is tuned to preferentially measure the k component of the array that is matched to $k_0$; the width of this response is approximately $\Delta k=k-k_0\sim\pi/L$, or $\Delta \sin(\theta)\sim\lambda/(2L)$. Thus, the Fourier Gauge measures the response of every element or super-element in the array at the desired wavevector, or equivalently, at the desired steering angle θ in the direction of the Fourier Gauge column. By phase aligning all super-element phase controls to maximize their vector sum as measured by the Fourier Gauge, one can effectively align the array to the desired steering angle. Similarly, by appropriately adjusting all super-element amplitude controls to yield the desired amplitude taper as measured by the Fourier Gauge, one can set the super-element amplitudes to yield the desired array illumination function.

FIGS. 9A and 9B shows a high level virtual calibration system 900 in accordance with exemplary embodiments of the invention. As shown in the end view of FIG. 9A, an x-axis extends left and right looking at the page and a z-axis extends up and down. As shown in the top view of FIG. 9B, the x-axis extends left and right looking at the page and the y-axis extends up and down. In one particular embodiment, a calibrator 902 comprises one super-element that moves in steps in relation to the array to provide virtual calibration. In the illustrated embodiment, the calibrator 902 moves above the array along the y-axis so that the position on the x-axis and the z-axis do not change as the calibrator moves from one end of the array to the other.

It is understood that the error of this calibration will be determined by the unknown error in position of the Fourier Gauge at every location that it stops and makes a measurement, and the error of the instrumentation in rf measurements. The net phase error due to the position error is approximately $\Delta\phi\sim\Delta x*2\pi/\lambda$. This phase error would be rms averaged with the instrumentation error to get the net calibration errors. At S-band frequencies, with positional accuracies $\Delta x$ of approximately 1 mm, phase errors would result of roughly 4° rms. Instrumentation errors would be lower.

FIG. 9A shows the calibrator super-element 902 having a position $x_{gi}=x_0$, $y_{gi}=id_g$, and $z_{gi}=z_0$. The calibrator 902 moves in steps of length $d_g$ along the y-axis. At the ith step, the y-axis position of the calibrator will be $id_g$. The position on the x-axis and the z-axis do not change as the calibrator 902 moves along the y-axis.

The position of the calibrator 902 is also defined in relation to each of the super-elements in the array. In one embodiment, the coordinates are defined by $r_j$, $\theta_j$ for the calibrator 902 in relation to a super-element at coordinates $x_{ej}$, $y_{ej}$, 0. Since the array is located the plane of the z-axis, the z coordinate for the super-elements is zero.

As the calibrator 903 moves in steps of i over N positions spaced by dg, a vector sum of voltages is computed with appropriate corrections for measured position, as follows:

$$V_{Tj} = \sum_{i=1,N} \exp[j\Delta\phi_{ij} + jk_y id_g] C_{ij} V_j = V_{Taylor}(x_{ej}, y_{ej})\exp(-jk_r r_j)/r_j^{1/2} E_{se}^2(\theta)$$

where $\Delta\phi_{ij}=k_r[\Delta x_i(x_o-x_{ej})r_j+\Delta z_i z_o/r_j]+k_y\Delta y_i$ $E_{se}(\theta)$ is the transverse radiation pattern of super-element, calibrator, and $C_{ij}$ is the measured coupling, coefficient between super-element j and calibrator at position i $r_j=[(x_{ej}-x_o)^2+z_o^2]^{1/2}$ $k_y=2\pi \sin(\beta(f))/\lambda$, $k_r=[k_o^2-k_y^2]^{1/2}$ where $\beta(f)$=desired steering angle θ in direction of Fourier Gauge column at frequency f, $k_y$=component of k vector in direction of Fourier Gauge column, and $(\Delta x_i, \Delta y_i, \Delta z_i)$=vector position error of Fourier Gauge super-element at location i. The above prescribes how to adjust the phase and amplitude of each element j; both are adjusted so that the equation is satisfied for each element.

The above specifies $V_j$ for all array super-elements. It is understood that any practical number of calibrators can be used. Multiple calibrators can be used to compare results and assure reliable calibration.

As the calibrator of length $d_g$ moves in steps of $d_g$ along y axis, the error in position i of the calibrator=$(\Delta x_i, \Delta y_i, \Delta z_i)$. This position error results in a phase error in the Fourier Gauge measurements at position i, which contributes to the calibration error budget, as discussed above.

Figure 10A:
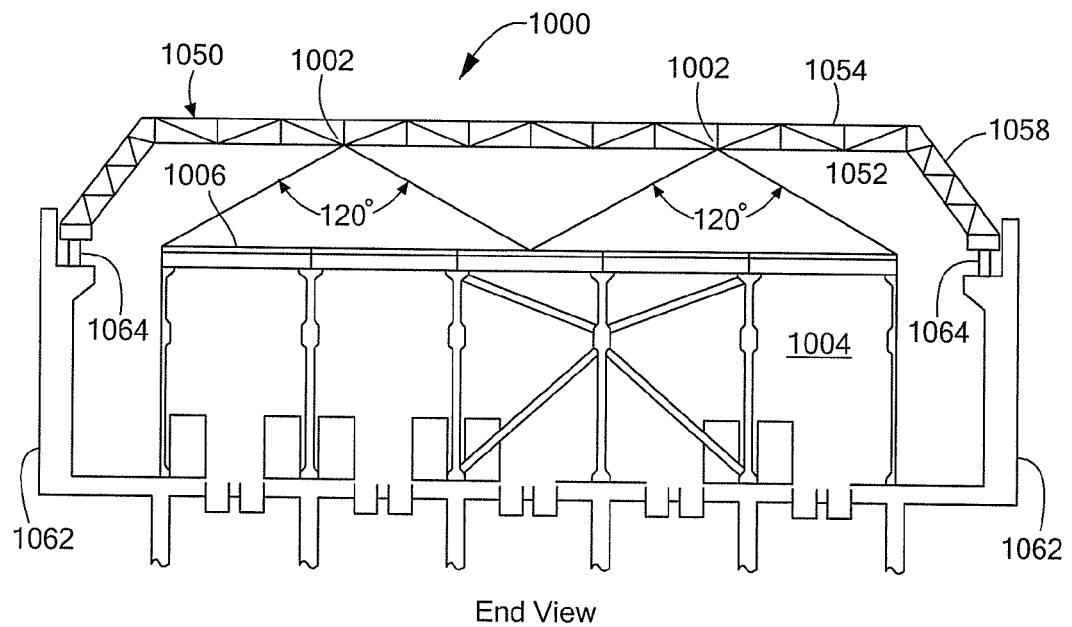
FIG. 10A is a schematic end view of a calibration system and array.
Figure 10B:
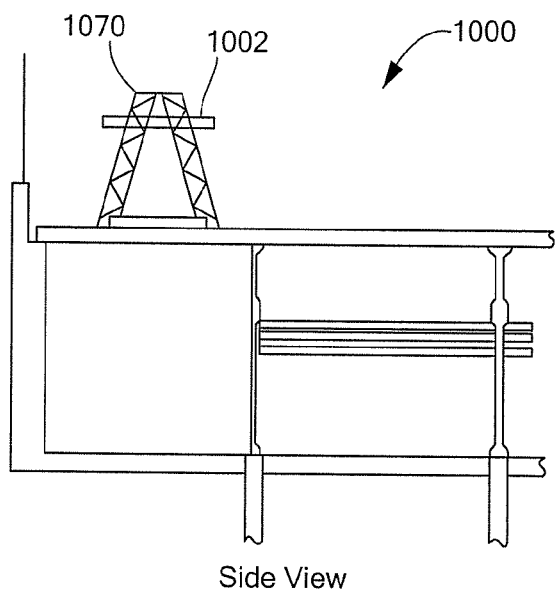
FIG. 10B is a schematic side view of a calibration system and array.
Figure 10C:
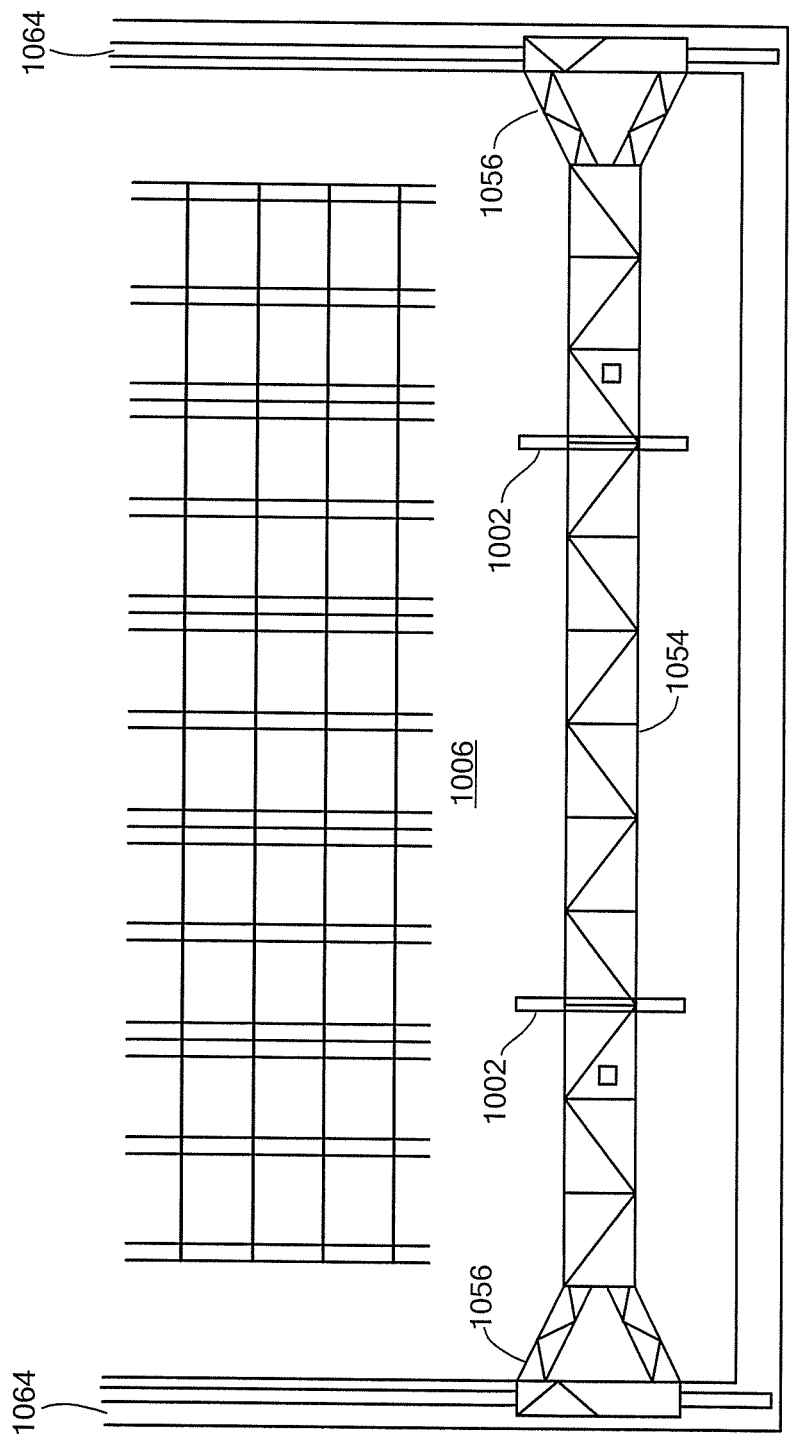
FIG. 10C is a schematic top view of a calibration system and array.
Figure 10D:
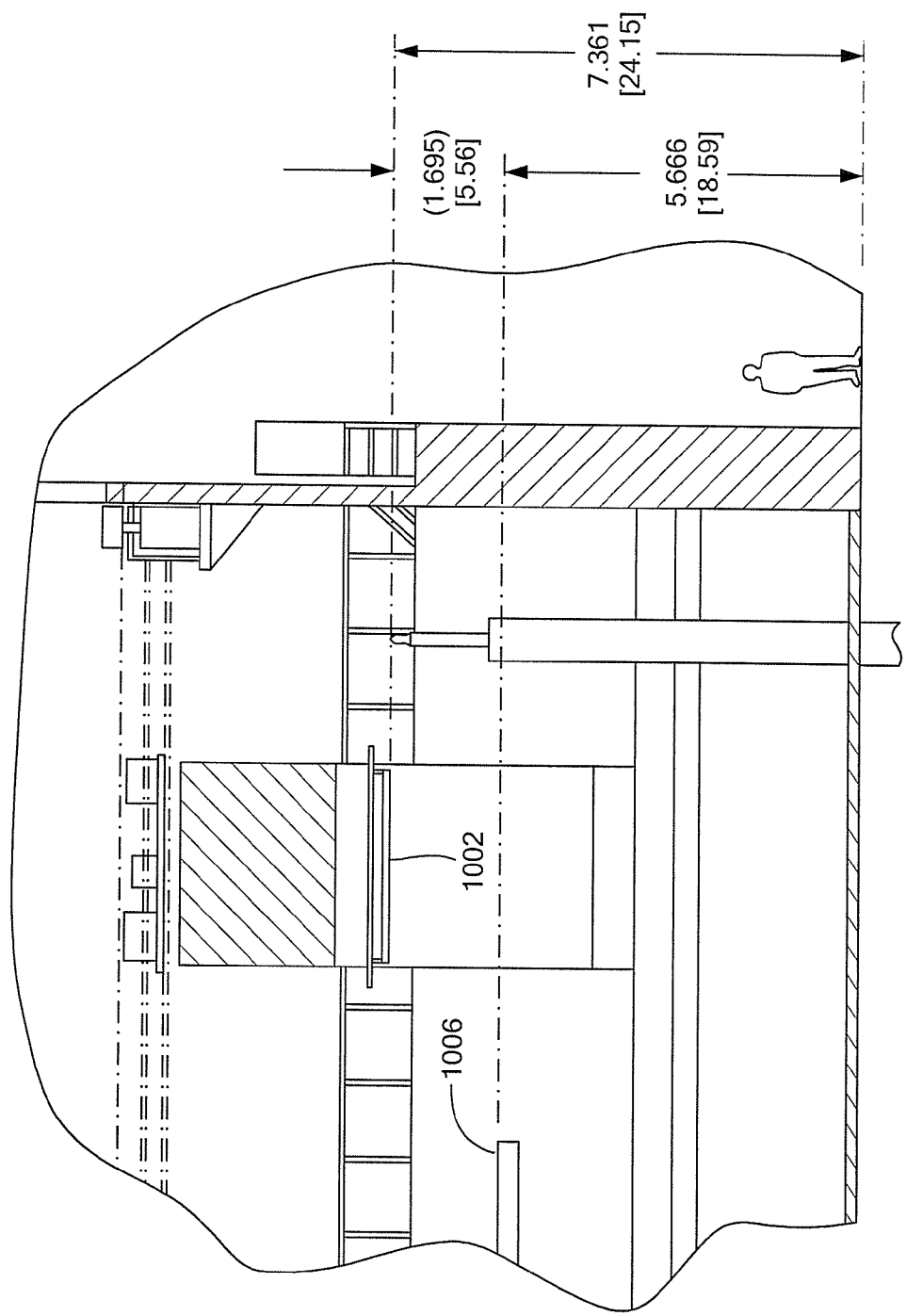
FIG. 10D is a schematic partial view of a calibration system and array.

FIGS. 10A (end view), 10B (side view), 10C (partial top view), and 10D (partial side view with exemplary dimensions) show an exemplary system 1000 for positioning a calibrator 1002 in relation to a large array. A support structure 1004 supports the array elements 1006, such as super-elements, forming the array. In general, the support structure 1004 should support the array elements while allowing operator access to the array components.

A calibration system 1050 includes a mechanism to manipulate the calibrator to obtain information for calibrating the array. In an exemplary embodiment, the calibration system 1050 includes a crane 1052 that span across a width of the array. The crane 1052 includes a main member 1054 with respective connecting members 1056, 1058, which are supported by beams 1060, 1062 on each side of the array. Rail members 1064 on the beams allow the crane to move in a controlled manner. The crane 1052 moves along a length of the array to position the calibrator 1002 during the calibration process under the control of a calibration module 1070 that controls the Fourier Gauge calibration process and processes the information received at the calibrator 1002.

Figure 11:
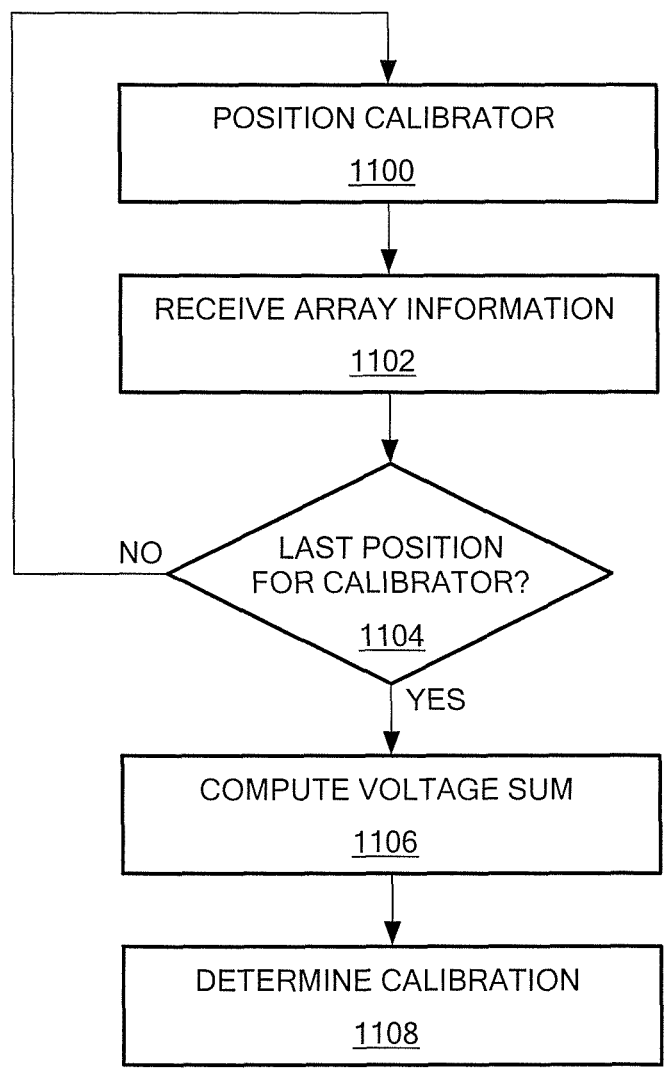
FIG. 11 is a flow diagram showing exemplary sequence of steps for calibrating an array in accordance with exemplary embodiments of the invention.

FIG. 11 shows an exemplary sequence of steps for implementing calibration in accordance with exemplary embodiments of the invention. In step 1100, a calibrator, which can be provided as a super-element, is positioned over an array. In step 1102, the calibrator receives information from the array. In step 1104, the system determines whether the calibrator has been positioned at the last location to receive information from the array. If not, processing continues in step 1100. If so, a voltage sum is computed, such as set forth in equation (1), in step 1106. In step 1108, a level of calibration is determined for the array.

Exemplary embodiments of the invention enable array calibration without blockage from calibration. The Fourier Gauge is moved across the array taking rf measurements and removed. Thus, there is not blockage issue, as would be the case for a series of fixed super-elements on the side of the array.

In addition, with the inventive Fourier Gauge embodiments, calibration is intrinsically accurate, to the accuracy of the rf instrumentation and the error in knowing the position of the Fourier Gauge super-element each time it stops to take a measurement. There are no cables and no need to precision calibrate a series of fixed super-elements located in fixed positions. In one embodiment, the Fourier Gauge super-element has no cables; as it is moved, new measurements are logged using wireless or laser based communications and rf links.

Since the Fourier Gauge super-element can move across the entire array, the entire array can be calibrated. If only a single FG super-element or an FG of limited size is used, only a portion of the array could be illuminated, and calibration would not be complete.

When the measurements of the different FG super-element positions are vector summed, the result is a 'virtual' long, precision, super-element that runs the length of the array. The coupling of this long, virtual super-element to each element of the array is simple and predictable, leading to a high precision method of calibrating each element.

Figure 12:
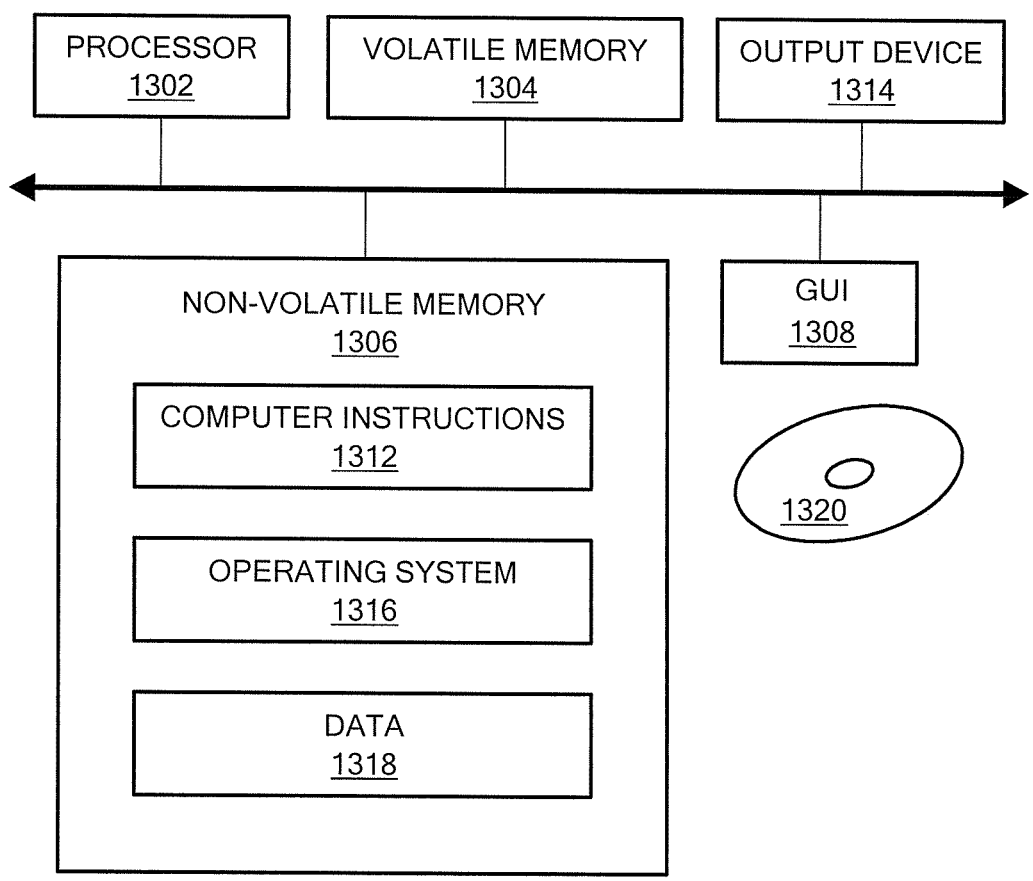
FIG. 12 is a schematic representation of an exemplary computer that can form a part of a calibration system in accordance with exemplary embodiments of the invention.

Referring to FIG. 12, calibration processing in accordance with exemplary embodiments can be performed on any suitable computer. The illustrative computer includes a processor 1302, a volatile memory 1304, a non-volatile memory 1306 (e.g., hard disk), a graphical user interface (GUI) 1308 (e.g., a mouse, a keyboard, a display, for example) and the output device 1314. The non-volatile memory 1306 stores computer instructions 1312, an operating system 1316 and data 1318. In one example, the computer instructions 1312 are executed by the processor 1302 out of volatile memory 1304. A disc 1320 can store instructions that can be executed by the processor.

Processing is not limited to use with the hardware and software of FIG. 12 and may find applicability in any computing or processing environment and with any type of machine or set of machines that is capable of running a computer program. Processing may be implemented in hardware, software, or a combination of the two and may be implemented in computer programs executed on programmable computers/machines that each includes a processor, a storage medium or other article of manufacture that is readable by the processor (including volatile and non-volatile memory and/or storage elements), at least one input device, and one or more output devices.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A system, comprising:
   a calibration system, comprising:
   a support structure movable over an array comprising elements;
   a calibrator secured to the support structure to obtain information at selected locations in relation to the array, wherein the locations are along a first axis with substantially no change along second and third axes, wherein the first, second, and third axes define a three-dimensional space; and
   a calibration module comprising a computer processor to compute a sum of voltages from the information for the locations of the calibrator with respect to the array for determining a level of calibration for the elements in the array, wherein the sum provides a virtual super-element that runs a length of the array along the first axis.

2. The system according to claim 1, further including a controller to move the calibrator in steps along a length of the array.

3. The system according to claim 1, wherein the calibration module computes a position error of the calibrator.

4. The system according to claim 1, wherein the calibrator has the same structure as an array element.

5. The system according to claim 1, further including an optical element to optically align a position of the calibrator.

6. The system according to claim 1, further including a further calibrator to calibrate the array.

7. The system according to claim 1, further including a track to support the support structure.

8. The system according to claim 1, wherein a length of the array is over 160 meters in length.

9. The system according to claim 1, wherein the calibrator comprises a super-element.

10. A method, comprising:
  positioning a calibrator to positions over an array comprising elements, wherein the positions are along a first axis with substantially no position change along second and third axes, wherein the first, second and third axes define a three-dimensional space;
  receiving responses at the calibrator for the positions of the calibrator; and
  computing, using a computer processor, a vector sum of voltages from the responses at the calibrator to determine a level of calibration of the array elements, wherein the sum provides a virtual super-element that runs a length of the array along the first axis.

11. The method according to claim 10, further including determining a position error of the calibrator in relation to the array.

12. The method according to claim 10, further including adjusting phase and/or amplitude controls of elements in the array based on the responses at the calibrator.

13. The method according to claim 10, wherein the calibrator comprises a super-element and the array comprises super-elements.

14. The method according to claim 10, further including phase-aligning array elements to maximize a vector sum at the calibrator for aligning the array to a selected steering angle.

15. The method according to claim 10, further including adjusting array element amplitude controls to provide a desired amplitude taper at the calibrator.

16. An article, comprising:
  a non-transitory computer-readable medium having stored instruction that enable a machine to perform:
  positioning a calibrator to positions over an array comprising elements, wherein the positions are along a first axis with substantially no position change along second and third axes, wherein the first, second and third axes define a three-dimensional space;
  receiving responses at the calibrator for the positions of the calibrator; and
  computing, using a computer processor, a vector sum of voltages from the responses at the calibrator to determine a level of calibration of the array elements, wherein the sum provides a virtual super-element that runs a length of the array along the first axis.

17. The article according to claim 16, further including instructions for processing a position error of the calibrator in relation to the array.

* * * * *